July 14, 1925.  1,546,287
A. F. KOERBER
TRANSMISSION CONTROL
Filed April 10, 1922    4 Sheets-Sheet 3

A. F. Koerber
INVENTOR
BY Victor J. Evans
ATTORNEY

WITNESS:

July 14, 1925.

A. F. KOERBER 1,546,287

TRANSMISSION CONTROL

Filed April 10, 1922     4 Sheets-Sheet 4

Patented July 14, 1925.

1,546,287

UNITED STATES PATENT OFFICE.

ANTHONY F. KOERBER, OF DETROIT, MICHIGAN.

TRANSMISSION CONTROL.

Application filed April 10, 1922. Serial No. 551,110.

*To all whom it may concern:*

Be it known that I, ANTHONY F. KOERBER, a citizen of the United States, residing at Detroit, in the county of Wayne and State of Michigan, have invented new and useful Improvements in Transmission Controls, of which the following is a specification.

This invention relates to transmission means for transmitting movement from a drive member to a driven member so that the driven member can be given different speeds, the general object of the invention being to provide simple and effective means for connecting the driven member with the drive member in order to drive it at different speeds and to give it a reverse movement.

Another object of the invention is to provide brake means for controlling the movements of the different parts so that the different speeds of the driven member can be secured.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
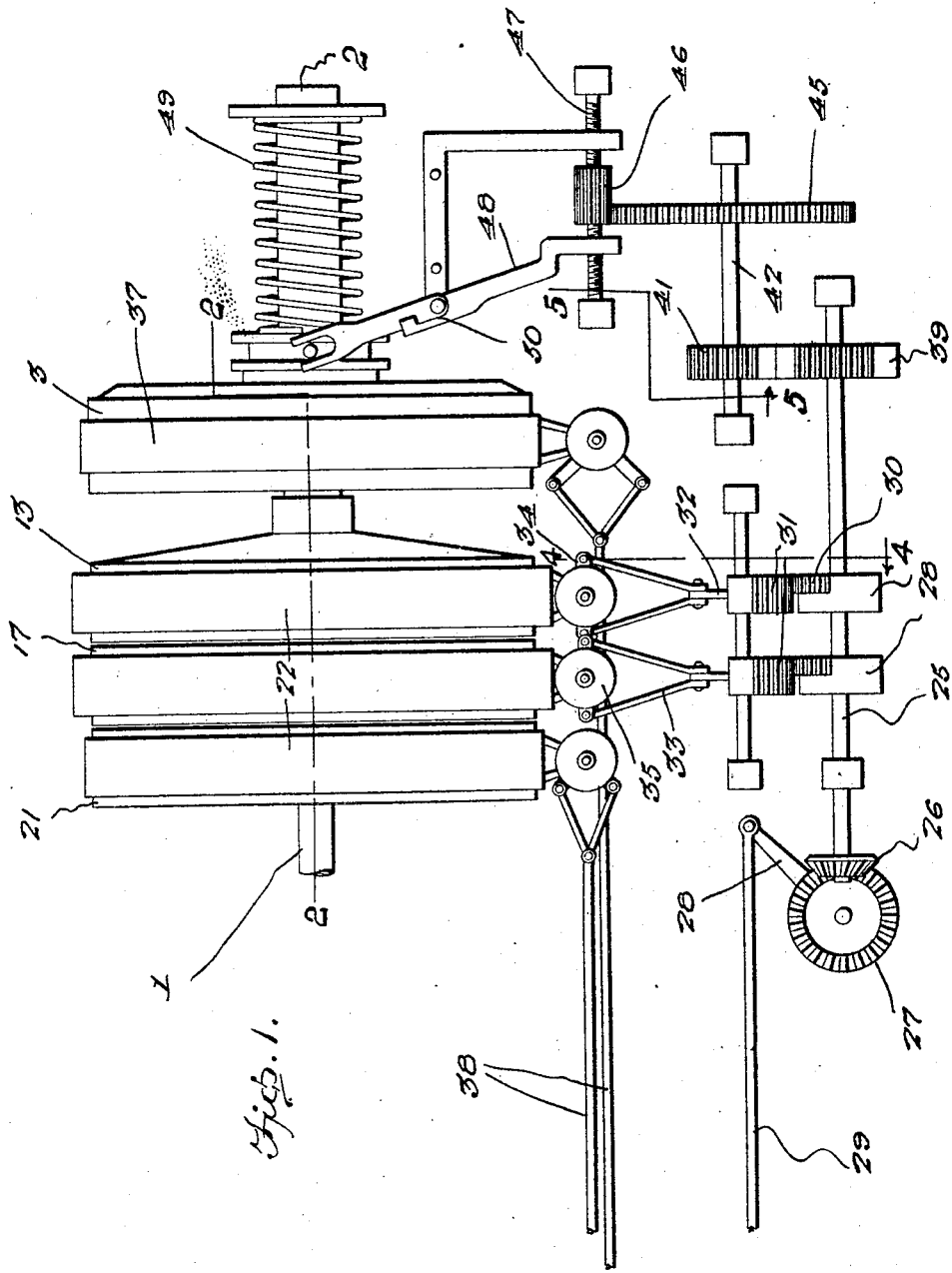
Figure 1 is a top plan view of the invention.
Figure 2:
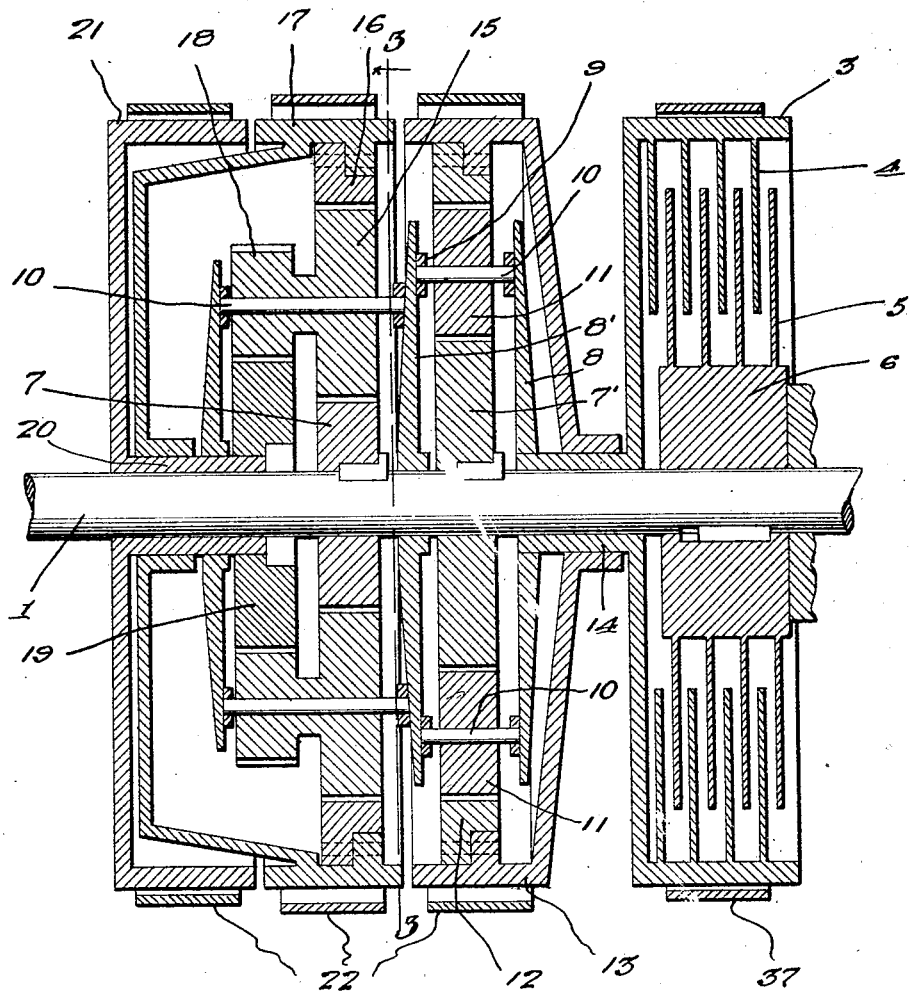
Figure 2 is a longitudinal sectional view taken on line 2—2 of Figure 1.
Figure 3:
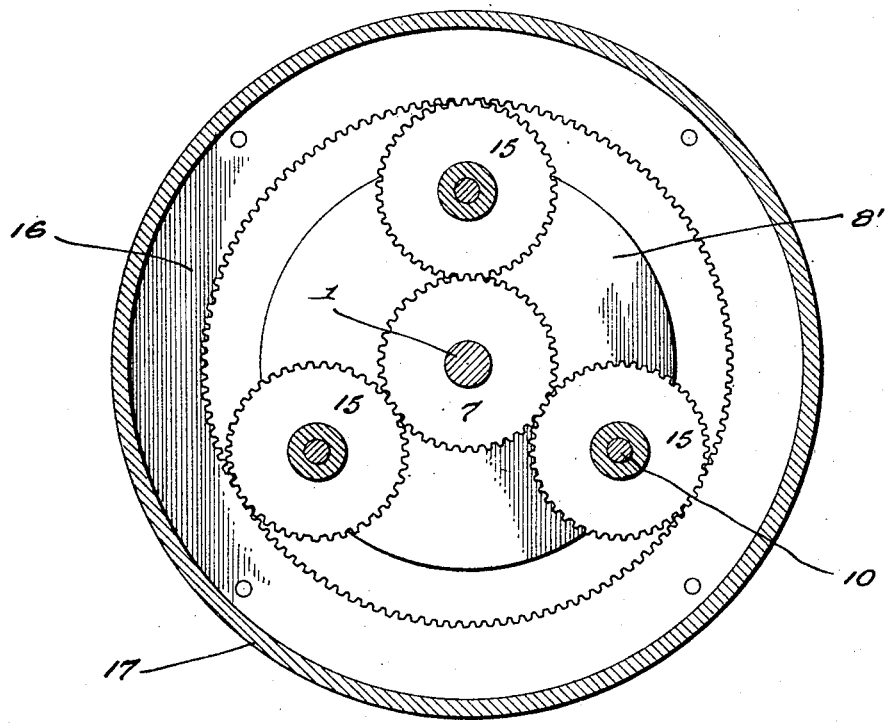
Figure 3 is a sectional view taken on line 3—3 of Figure 2 looking in the direction of the arrows.
Figure 7:
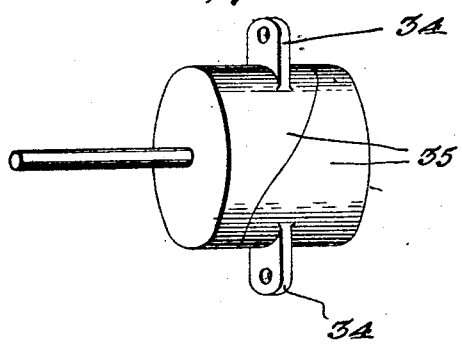
Figure 7 is a detail view of one of the cam members for operating the brake bands.
Figure 5:
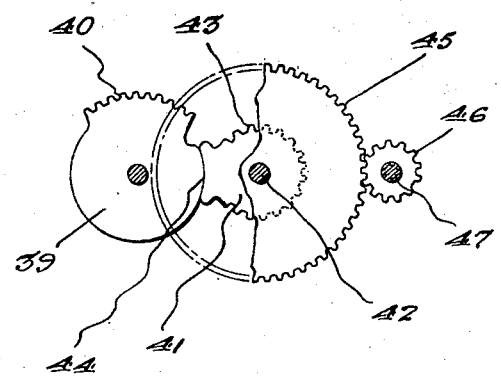
Figure 5 is a sectional view taken on line 5—5 of Figure 1 looking in the direction of the arrows.
Figure 6:
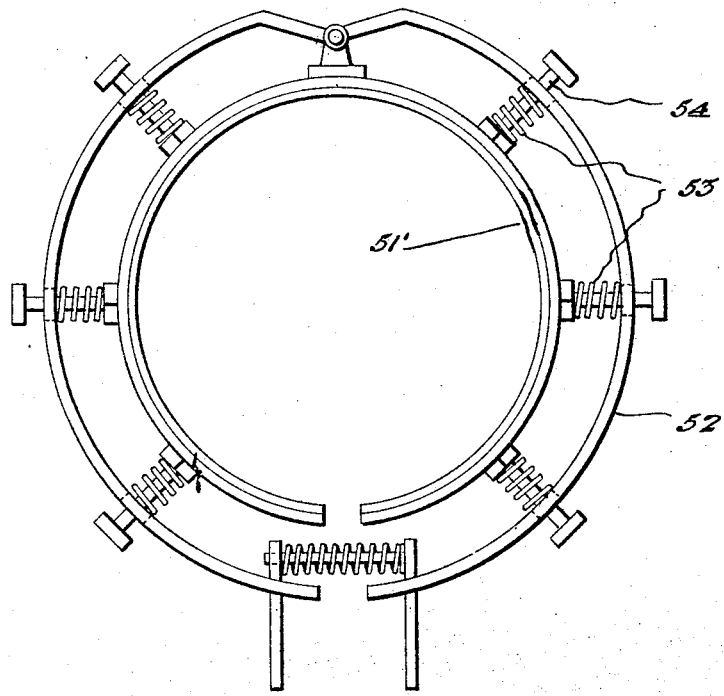
Figure 6 is a view of the modified form of the brake band to be used with the intermediate and low speed drums.
Figure 4:
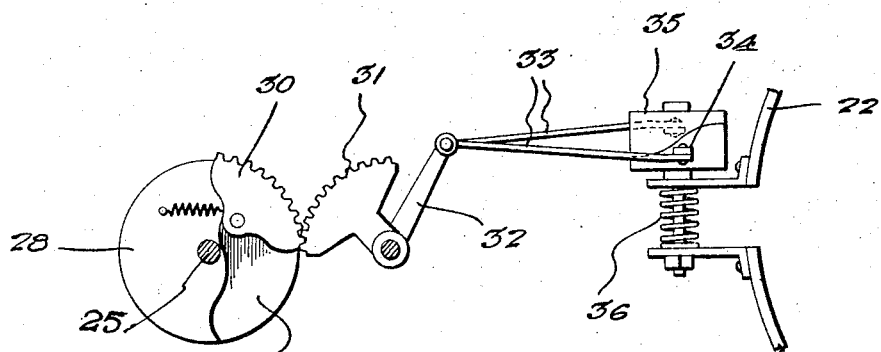
Figure 4 is a sectional view taken on line 4—4 of Figure 1 looking in the direction of the arrows.

In these views 1 indicates the drive shaft or the crank shaft of the engine and 2 the driven member or sleeve which is connected to a drum 3 which contains the friction discs 4 which cooperate with the discs 5 carried by the member 6 which is keyed to the shaft 1. As will be understood when the discs are moved into engagement with each other the drum will be driven directly from the shaft but when the discs are not in engagement the drum can move independently of the shaft. 7 and 7' are gears keyed to the shaft 1 and 8 and 8' are plates rotatably mounted on the shaft 1 and which are connected together by the brackets 9 and the shafts 10. Shafts 10, which are carried by the plates 8 and 8', carry gears 11 which mesh with the gear 7' and with a ring gear 12 carried by a drum 13. This drum 13 is rotatably mounted on a sleeve 14 which is rotatably mounted on shaft 1 and is connected with the plate 8 and the drum 3 so that drum 3 will rotate with the plates. Gears 15 are arranged on the shafts 10 which are carried by the plates 8 and 8', said gears meshing with the gear 7 and the ring gear 16 which is carried by a drum 17 and said gears 15 have small gears 18 connected therewith which mesh with a gear 19 which is secured to a sleeve 20 of a drum 21, sleeve 20 being rotatably mounted on the shaft 1 and the drum 17, rotatably mounted on said sleeve. Each of the drums 13, 17 and 21 is provided with a brake band 22 so that said drums can be held against movement by applying the brakes.

When drum 13 is held against movement by its brake the gears 11 are caused to travel around the gear 12 so that the plates rotate and as the drum 3 is connected with the plates this drum will also rotate and thus the member 2 will be rotated from the drive shaft at an intermediate speed. When a low speed is desired the drum 17 is held against movement so that the gears 15 will travel around the ring gear 16 and this slow movement will be imparted to the member 2 through drum 3 and the plates. When member 2 is to be given a reverse movement the drum 21 is held against movement so that the gears 18 will be caused to travel around the gear 19 and thus rotate drum 3 and the plates in a reverse direction. When the member 2 is to be driven at a high speed or at the same speed as shaft 1 is revolving the member 2 is connected directly with said shaft by means of the clutch discs 4 and 5 which connect the drum 3 to said shaft 1.

The controlling means are arranged as follows: A shaft 25 is provided with a bevel pinion 26 which engages a bevel gear 27 to which is secured the arm 28. This arm is connected by link 29 with a manually operating part so that the gear 27 can be given nearly a complete revolution. The shaft 25 has secured thereto the wheels 28' which are each provided with a recess 29' in which is located a toothed sector 30 which is eccentrically pivoted to the wheel and in one position will engage one wall of the recess with its teeth concentric to the circumference of the wheel so that the teeth will engage a sector 31, but when the wheel 28' is moved in an opposite direction the sector 30 will move into the recess 29' so that its teeth cannot engage the sector 31. The sectors 31 are each connected with an arm 32 and this arm is connected by the links 33 with the ears 34 on the cam members 35, said cam members being secured to the brake bands 22 of the drums 13 and 17. As will be seen when these cam members are turned to force them apart the band will be contracted to apply the brake, the band being expanded by means of the spring 36 when the cam members are in neutral position. I may provide similar cam members for operating the brake 37 of the drum 3 and for operating the brake band for the drum 21, these cams being preferably connected with pedals or levers by the links 38 so that they can be manually operated.

The shaft 25 also carries a wheel 39 which is provided with teeth 40 on a part of its periphery, the major part of the periphery being smooth. A wheel 41 is mounted on shaft 42, said wheel having teeth 43 on the major part of its periphery for engaging the teeth 40, said wheeel 41 also having a projecting part 44 for engaging the smooth part of the periphery of wheel 39 to prevent movement of wheel 41 until the teeth 40 come into engagement with the teeth 43 when said wheel 41 will be rotated. Shaft 42 carries a large gear 45 which meshes with the gear 46 which is fastened to shaft 47, having a right and left worm thread. This worm will allow the lever 48 to move backward so as to release the spring 49 which is located on member 2 and the expansion of this spring will force the clutch discs 4 and 5 into engagement to connect drum 3 directly with shaft 1. When shaft 25 is given a reverse movement the gear will contract the spring again and thus release the clutch discs. Lever 48 is formed of two parts, as shown at 50, so that an emergency foot lever may be used for disengaging the clutch discs. 37 is the service brake which may be operated by a foot pedal or the like.

The brake bands 22 for the intermediate and low speed drums should be provided with tension springs so as to allow the sectors operated therein to turn without jamming in case the brake bands should be set too tight. These brake bands are therefore constructed of inner rings 51 and outer rings 52 the tension springs being shown at 53, and these springs are located on the bolts 54 which are secured to the inner ring and pass through openings in the outer ring. The outer ring will engage the heads of these bolts and thus force the inner ring away from the drum regardless of the tension of the springs. The bolts may be provided with nuts between the springs and the inner ring so that the springs may be tensioned to take up wear of the brake lining.

From the above it will be seen that the gears are in constant mesh and that all the speeds are controlled from a single lever or handle without the necessity of a clutch for shifting from one speed to another.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. Transmission means of the class described comprising a drive shaft, a driven member, a clutch drum connected with the driven member, friction discs for connecting the drum directly with the drive shaft, intermediate and low speed gears on the drive shaft, a cage rotatably mounted on the shaft and connected with the drum, a pair of drums, ring gears carried thereby and meshing with the gears of the cage, brake means for said drums, a shaft, manually operated means for rotating the same, wheels on the shaft, eccentrically arranged sectors in said wheels, a pair of sectors arranged to be engaged by the sectors in the wheels when said wheels are rotated in one direction and means for operating the brake means by the movement of said sectors.

2. Transmission means of the class described comprising a drive shaft, a driven member, a clutch drum connected with the driven member, friction discs for connecting the drum directly with the drive shaft, intermediate and low speed gears on the drive shaft, a cage rotatably mounted on the shaft and connected with the drum, a pair of drums, ring gears carried thereby and meshing with the gears of the cage, brake means for said drums, a shaft, manually operated means for rotating the same, wheels on the shaft, eccentrically arranged sectors in said wheels, a pair of sectors arranged to be engaged by the sectors in the wheels when said wheels are rotated in one direction and means for operating the brake means by the movement of said sectors, such means consisting of cam members connected with the brake bands and means for operating the cam members by movement of the sectors.

3. Transmission means of the class described comprising a drive shaft, a driven member, a clutch drum connected with the driven member, clutch discs for connecting the drum directly with the shaft, means for driving the drum at speeds slower than that of the shaft, a spring for forcing the clutch discs into engagement with each other, a lever for contracting the spring, a screw shaft for operating the lever, a pinion on the screw shaft, a second shaft, a gear thereon meshing with the pinion, a rotatable shaft, means for rotating the same and gears connecting the last mentioned shaft to the second shaft for giving said second shaft a partial rotation during a movement of the manually operated shaft and holding said second shaft stationary for the remainder of the movement of the manually operated shaft.

In testimony whereof I affix my signature.

ANTHONY F. KOERBER.